Jan. 28, 1969        C. G. HART        3,423,908
SIDE-LOADING FILTER HOUSING
Filed June 16, 1966                    Sheet 4 of 4

INVENTOR.
CHARLES G. HART
BY
ATTORNEY

United States Patent Office 3,423,908
Patented Jan. 28, 1969

3,423,908
SIDE-LOADING FILTER HOUSING
Charles G. Hart, Syracuse, N.Y., assignor to Cambridge Filter Corporation, Syracuse, N.Y., a corporation of New York
Filed June 16, 1966, Ser. No. 557,987
U.S. Cl. 55—481                        7 Claims
Int. Cl. B01d 29/06, 46/42

ABSTRACT OF THE DISCLOSURE

Housing for space filter units comprising spaced parallel horizontal trackways for downstream filter units and upstream pre-filter units, with access doors on either side large enough to permit sliding replacement filter units into position and sliding spent units laterally out of the housing, the housing acting as a part of a duct, and having at its downstream end vertical sealing frames for engaging continuous edge seals on each of the downstream units, and pressure applying means acting through resilient arms of independent coil springs bearing against the upstream edges of the units to hold the edge seals continuously against the sealing frames for each downstream unit.

---

This invention relates to filter housings for replaceable filter cartridges, the housings having provision for replacment from the side, and assuring an effective air seal.

Filter banks employing replaceable cartridges are often located in association with duct work leading to or from the bank. To provide access to the filter bank for cartridge replacement, has required access to the duct work for removal of and insertion of replacement filter cartridges whether prefilters or high efficiency filters. Such provision for access takes up space. In the removal of cartridges, and insertion of new cartridges there is the possibility of contamination during the brief period of time between removal and replacement, and in the replacement of the cartridges, each cartridge must be individually seated and sealed in its frame.

The present invention is directed to a housing suitable for a bank of cartridges, with provision for replacement from the side. The invention is also directed to apparatus for applying yielding resilient pressure upon a cartridge to seal the same, when in position, within the frame, the resilient pressure adapted at all times to maintain pressure on the sealing gasket material. The apparatus is further effective in sealing a number of cartridges in a row in a single operation. By reason of the side loading feature, cartridges are removed and replaced by movement crosswise of the duct, whereby minimum disturbance results so as to minimize the chance for contamination by air passing through the filter bank, in the brief interval of changing cartridges. Further if desired, by providing side access to both sides of the bank it is possible to slide in fresh cartridges simultaneously with the sliding out of spent cartridges from the other side, so that the only chance for contamination would occur from the temporary loosening of the face seal of the cartridges. By apparatus adapted to provide yielding pressure on the seals of a row of cartridges simultaneously, the time during which the seal is loosened for the sliding in and removal of cartridges, in a housing having side loading on both sides, is kept to a minimum, since the seal is loosened in respect to the entire row simultaneously, and restored upon the replacement cartridges simultaneously.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
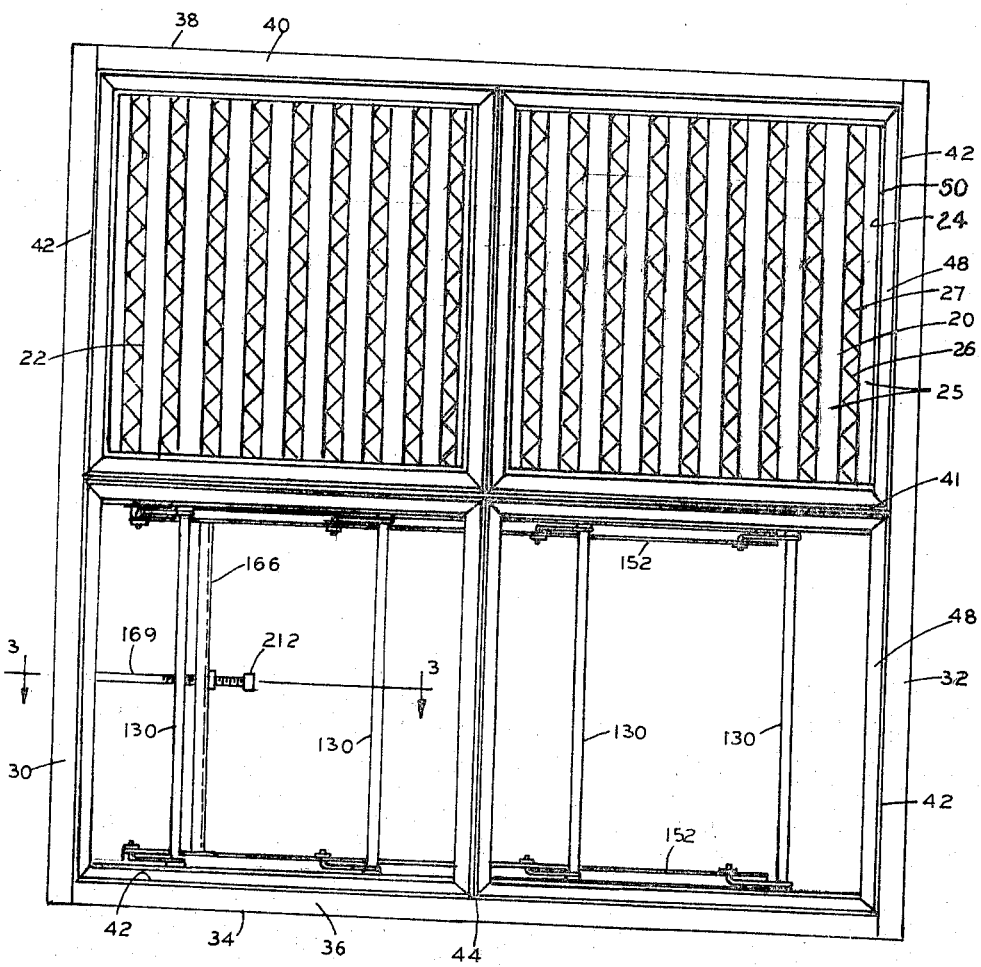
FIGURE 1 is a front view of a filter bank housing for two rows of two cartridges each, two cartridges on the lower row being removed.

Referring to FIGURE 1, there is shown a filter housing from the outflow or rear side, for accommodating four filter cartridges, of the ultra high efficiency type in a filter bank, two of such cartridge being disposed above the others, the upper two being indicated at 20 and 22, while the lower two have been removed to expose the interior of the housing. Each of the filter cartridges, comprises a square open frame of plywood 24 or other suitable material within which is disposed an elongate sheet of filter media 25 arranged in deep pleats over corrugated separators 26, alternate separators 26 providing entrance passages for gas entry into the cartridge, while the intervening separators 27 provide for gas outflow. The filter media in such cartridges has its edges sealed to the cartridge frame so as to prevent bypass.

It will be apparent that the frame of such cartridges, when installed in a housing for use, must have a continuous sealed engagement, to restrict the flow of gasses to passage through the filter media. Referring again to FIGURE 1, there will be seen a pair of upright side angle members 30 and 32 extending from top to bottom, a base member 34 having a skirt 36 extending to the floor, a cover 38 flanged upwardly as at 40, and a sheet metal shelf 41 midway between. In the outflow face are disposed four sealing frames 42 of identical construction, the lower frames abutting each other as at 44 and fitting between the upright members 30 and 32, base 34 and shelf 41, while the upper frames fit between the members 30 and 32, shelf 41 and cover 38. Such frames are formed of sheet metal 46, having an inward sealing offset 48 along the upstream edge.

The filter cartridge open frame 24, of metal or plywood, may be about ¾ inch thick, and its downstream edge is provided with a continuous sealing strip 50 of neoprene or other suitable material, extending around the entire face of the wood frame, such sealing strip being preferably adhesively bonded to the wood frame. The dimensions of the offset 48, of each frame 42 is such as to engage the seal strip 50 of a cartridge approximately at the center line of the seal strip, so that by applying pressure to the rear of the upstream edges of the cartridge frame, the offset 48 will embed slightly in the resilient sealing strip 50, and effect a continous seal along the entire edge of the cartridge frame and the frame 42.

Figure 2:
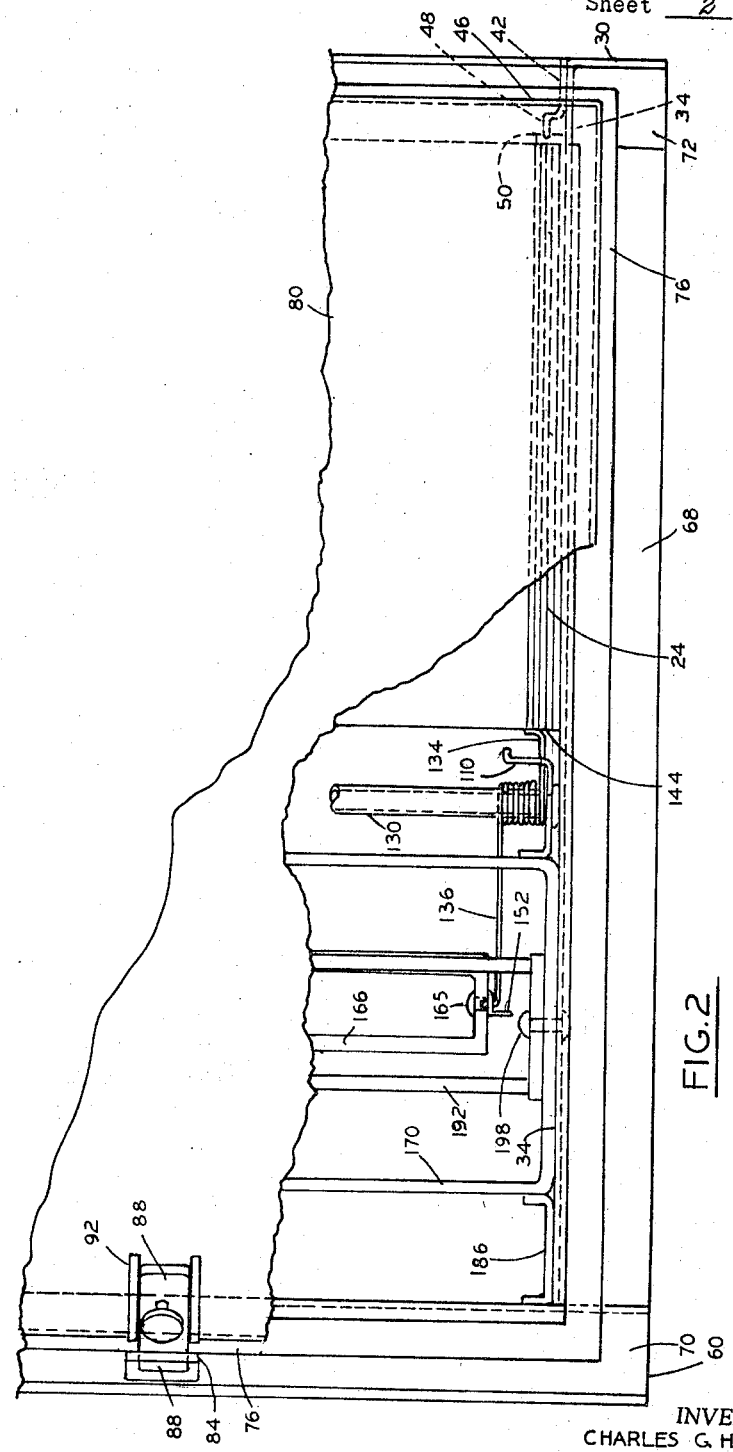
FIGURE 2 is an enlarged fragmentary side view of the lower portion of the housing, with a part of the door or side cover broken away.

One end of the filter housing may comprise a frame formed by the angle iron 30, and a second upright Z section angle iron 60, the angle faces 62 and 64 of which match the angle iron 30 and extend from top to bottom, while the flange 66 terminates at the base 30 and cover 38. The base may have an end flange or skirt 68, flush with the surfaces 72 and 70 of the angle iron 30 and member 60 respectively, see FIGURE 2, and the cover may have an upstanding end flange 74, likewise flush with the surfaces 72 and 70 of the angle iron 30 and Z member 60 respectively. A continuous neoprene seal strip 76 extends along the inside marginal edge of the surfaces 72 and 70, skirt 68 and flange 74, the marginal edge defining a rectangular side or end access opening to the housing. The opposite end of the housing may be similarly formed.

Closure panels 80 having a continuous flange 82 adapted to engage the center area of the seal strip 76 are adapted to close the side openings of the housing. In practice two or more brackets 84 on a side may be affixed to the surfaces 70 and 72, to guide the lateral location of the closure panels 80. Such brackets also have slots 86 adapted to receive the tongue 88 of clamping members 90 affixed to the panels. Such clamping members comprise a channel 92 affixed to the panel, within which the tongue 88, which may also be of channel section is pivoted on a cross pin 94. Each tongue has a slot 96 to permit retraction, and a screw 98 adapted to bear on the channel 92 so as to apply pressure, and cause the panel flange 82 to embed slightly into the seal, such screw having a knurled knob 100. The panel may have one or two handles, such as 102 affixed thereto, in the central, or upper and lower regions, to assist in removing or replacing the panel for service access.

Extending across the base 34 and the underside of the cover 38, are channel members 110 each having a continuous guide lip 112 extending toward the frames 42. Also extending across the inside edge 114 of the shelf 41 on opposite sides are similar channel members 116 also having guide lips 118, one channel facing upwardly and the other downwardly toward the respective channel members 110. The edge of the lips 112 and 118 are spaced from the horizontal portions of the sealing edge 48 of the frames 42 a sufficient distance to permit the frame 24 of a cartridge to be freely slid along the shelf 41, or the base 34.

At spaced intervals along the channels 112 and 116 are apertures 120 in which are positioned hat shaped pivot members 122 having annular flanges 124 disposed and held clamped between the respective channel members 110 and 116 and their respective base and cover members 34 and 38 or shelf member 41, the channel members being bolted to the shelf member 41, or base 34 and cover 38 at suitable intervals as indicated at 126. Securely telescoped over the opposed pairs of pivot members 122, are tubular spring fulcrum bars 130, two such bars being employed for each filter frame 42. Disposed about the end portion of each of the fulcrum bars 130, are resilient levers 131, comprising helical coil springs 132 loosely embracing the fulcrum bar 130, and lever ends 134 and 136 extending in generally opposite directions. The lever end 134, which may be referred to as a sealing finger, extends through a slot 140 in the channel members 112 or 116 and has an L end 142 adapted to bear against the inside end surface 144 of a cartridge frame 24. The L end is also adapted to retract beneath the lip 112, so as to avoid offering any obstacle to sliding filter cartridges into or out of the housing. The lever end 136 is provided with a right angle bend at its end 150, which is pivoted in a connecting angle iron or link 152, and secured by a spring washer 154. The link 152 is of sufficient length to connect to each of the lever ends 136 of the resilient levers 131, along a row. A corresponding upper link 152 is provided to connect with the upper resilient levers 131 of each row.

In order to actuate the upper and lower resilient levers 131 of a row of filter cartridges, to apply pressure to faces 144 of the cartridge frames, the upper and lower links 152 near one end are pivotally connected as at 162 and 165 to an equalizing frame 166, having a threaded bushing 168 at its center to receive a threaded tension member 169. The side opening adjacent the end of the links 152 and 152 having the equalizing frame 166, is provided with upper and lower rectangular frames 170 and 172, disposed between the channels 110 and 116, and oppositely facing pairs of channels 180 and 182, and 184 and 186 suitably spaced to form guideways for prefilters, which are slid in place or removed through the side openings, when replacement of prefilters is required. The channels 180 and 186 are secured to the flange 66 of the Z member 60, the respective frames 170 and 172 and cover 38 and base 34, and the channels 182 and 184 being back to back may be spot welded or otherwise secured. The frames 170 and 172 in turn are secured together and to the cover 38 and base 34 respectively and the upstream side flanges of the channels 110 and 116.

Pivotally mounted within the frames 170 and 172 are upper and lower swivel frames 190 and 192, the frames being free to swivel on pins 194, 196 and 198. A thrust block or plate 200 having a center aperture is disposed in the center of each of the frames 190 and 192, and the threaded shaft or tension member 169 is journalled in the thrust block, and provided with collars 202 and 204 on opposite sides. The collar 202 may form the hub of a hand crank 206 having a handle 208, the crank having a transverse inner end 210 pivotally disposed in a transverse aperture in the collar 202, so that the crank handle can be swung out of the way as indicated at 206', when the end cover panels are applied. The shaft 169 is provided with a collar 212 at its other end. A suitable thrust bearing 214 may be provided behind the collar 202.

Figure 3:
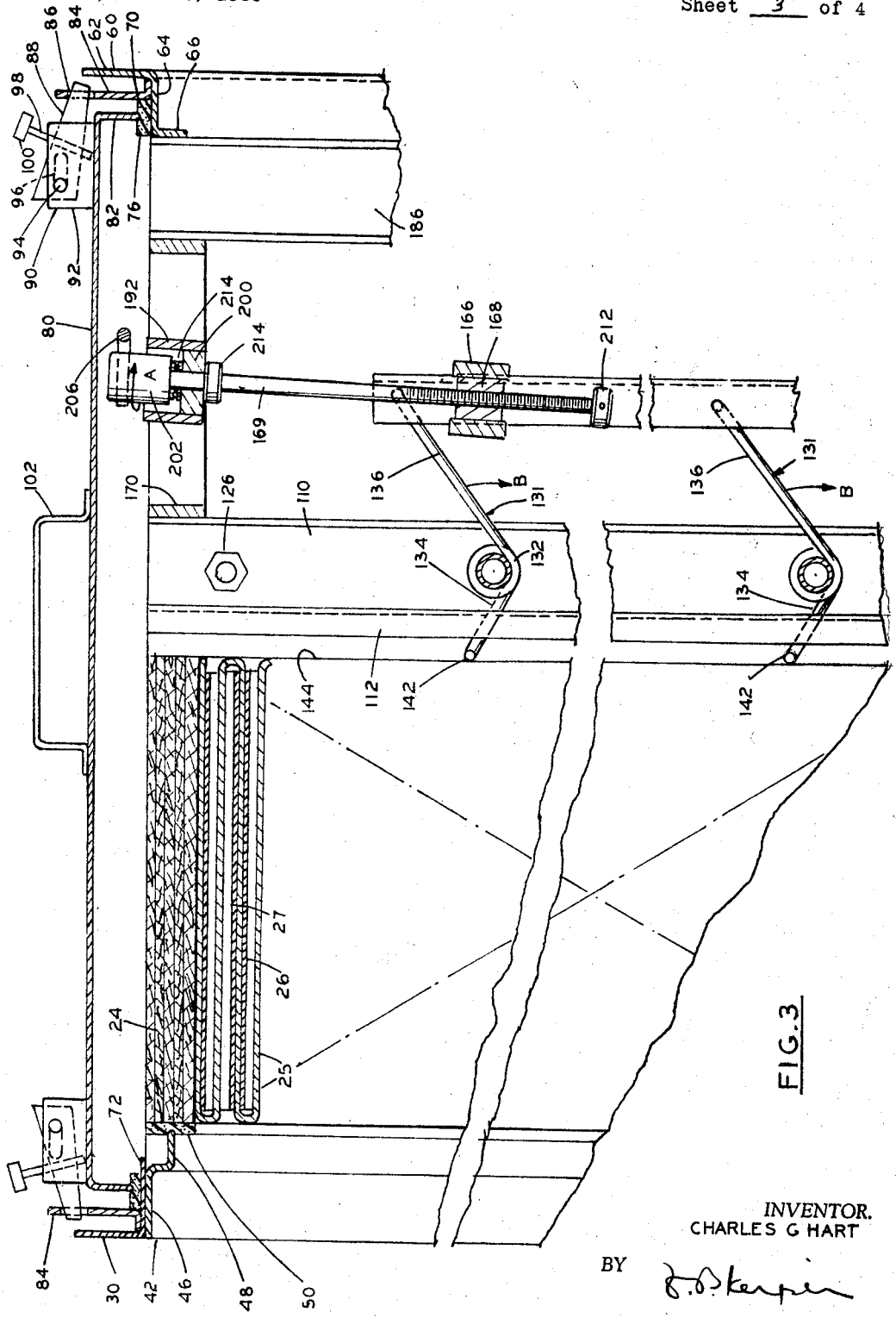
FIGURE 3 is an enlarged fragmentary horizontal sectional view taken substantially on the line 3—3 of FIGURE 1.
Figure 4:
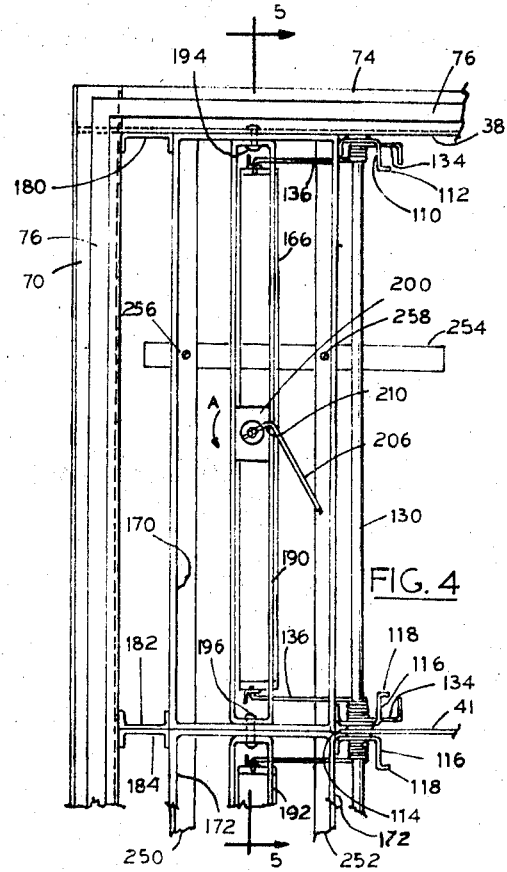
FIGURE 4 is a fragmentary end view with the side closure removed, showing the sealing mechanism.
Figure 5:
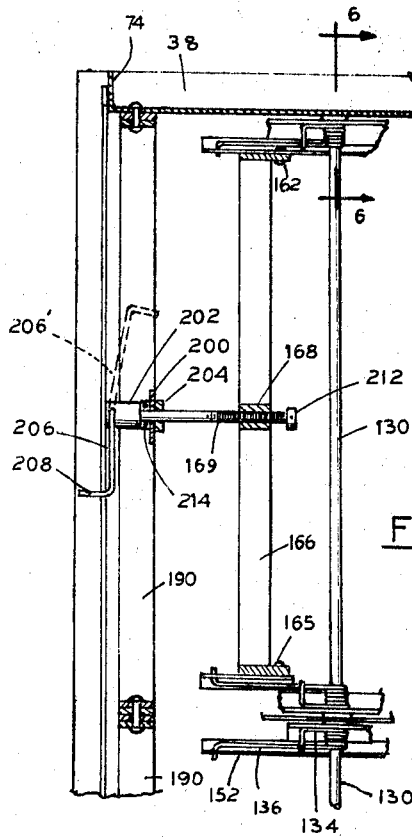
FIGURE 5 is a sectional view taken substantially on the line 5—5 of FIGURE 4.
Figure 7:
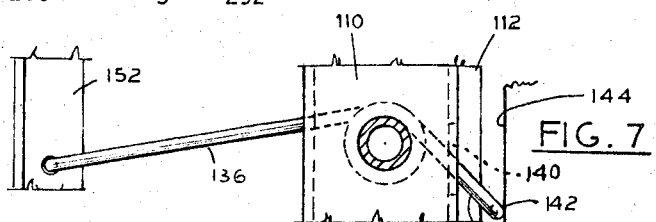
FIGURE 7 is a fragmentary sectional view taken on the line 7—7 of FIGURE 6.
Figure 6:
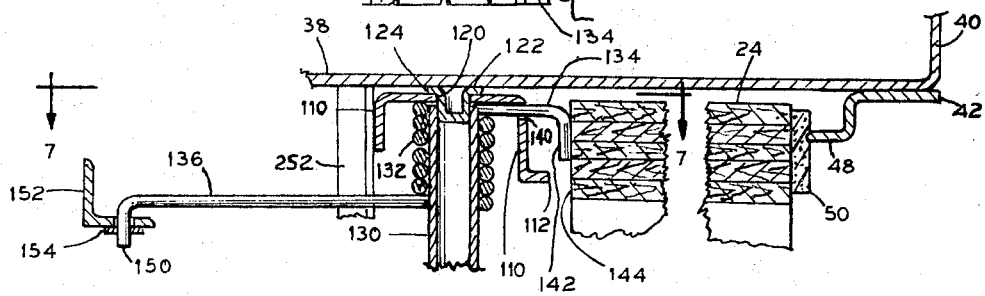
FIGURE 6 is an enlarged fragmentary sectional view taken substantially on the line 6—6 of FIGURE 5.

As can be best seen in FIGURE 3 rotation of the crank 206 in the direction of arrow A, counter-clockwise as seen in FIGURE 4, will rock the lever arms clockwise as seen in FIGURE 3 in the direction of arrow B, and will rock the ends 142 of the resilient arms 134 out of contact of the face 144 of the filter cartridge, and cause the ends 142 to retract beneath the lips 112 or 118 respectively of channel members 110 and 116. When retracted, the cartridges are readily slid out sideways for removal or replacement. When the cartridges are in position behind their respective frames 42, rotation of the crank clockwise swings the resilient levers 131 counter-clockwise as seen in FIGURE 3, causing the ends 142 to bear against and resiliently thrust the cartridges into sealed engagement with the frame 42. By employing four such levers 131 for each cartridge suitably spaced along the upper and lower cartridge frame members, uniform pressure is brought to bear against the offset 48 of the frame 42.

The hand operating mechanism including the cranks may be located at either end of the housing to suit conditions, and the housing may have identical end panels 80 at both ends, each sealed against an end frame gasket such as 76. If access to both ends is not desired, the end opposite that having the cranks can be closed by a permanently attached and sealed end panel. The ends of the prefilter channels 180, 184 and 186 as well as the ends of channels 110 and 116, at the ends opposite from the operating end may be supported in any suitable manner, such as by a second pair of frames 170 and 172

If desired, the opposite ends of the aforesaid channels may be supported upon vertical angle irons extending from base to cover as indicated at 250 and 252. When this is done, stop bars 254 may be detachably attached to the flanges of the angle irons as by screws 256 and 258 havnig wing nuts, not shown, to act as stops when inserting new filter cartridges or prefilters, the stop bar engaging the sides of the filter cartridge when slid over to the far side to a position in correct alignment with its frame 42, and assisting in the location of prefilters. The bar is readily removed, or swung out of the way on one of the screws 256 or 258, when spent cartridges or prefilters are to be removed.

When access to both ends of the housing is provided, the side panels 80 are removed and the replacement cartridges slid in from one side, as the spent cartridges are pushed out the other side. As soon as the replacement cartridges are suitably centered in respect to their respective frames 42, utilizing stop bars 254, if desired, the spring levers 131 or fingers 134 are resiliently urged against the filter cartridge frames to seal the same against leakage, or bypass.

The frames 42 and their mounting within the angle member 30, 32, base and cover and shelf must be air tight, each frame 42 being continuous and mounted within the uprights 30 and 32 and base and cover and shelf free of leaks. In practice the structure may be tested for leaks by soap bubble test. Any gas leakage around the high efficiency cartridges when installed must be avoided, and the effectiveness of the prefilters depends on the extent of avoidance of bypass therearound. The installation of replacement prefilters and removal of spent filters is accomplished by sliding the filter frames along the channels 182 and 180, and 186 and 184 as in the case of the high efficiency filter cartridges. Since prefilters are changed many times more often than the high efficiency cartridges, it will be seen that the installation and replacement of prefilters is effected without disturbing the seal of the high efficiency cartridges, and hence the outgoing duct beyond the high efficiency filters is protected against contamination, so long as the high efficiency filter cartridges are maintained sealed against their respective frames 42. Access to the prefilters for replacement is on the upstream side of high efficiency filters, and isolated from the duct carrying clean air therefrom. Hence only at such times as it is necessary to replace the high efficiency cartridges is there a chance for contamination, and even then, the prefilters tend to protect. The speed with which the high efficiency cartridges can be released and slid out while fresh cartridges are being introduced minimizes any shut down time.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A housing for space filter units of the type having a rectangular frame with pleated filter media disposed therein, said frame having a continuous rectangular sealing gasket on its downstream edges, said housing having support means for a filter unit and framing defining a rectangular opening against which the sealing gasket of the filter is adapted to bear, and resilient pressure means carried by said frame adapted to be brought to resiliently bear simultaneously against two opposite sides of the upstream rectangular edge of a filter unit frame to hold the filter unit sealed under resilient pressure against said rectangular opening framing, said pressure means being independent of said support means and including a plurality of individual resilient arms bearing directly upon the filter unit edge, and each arm being adapted to maintain pressure independent of the other arms.

2. A housing of the type set forth in claim 1, wherein the support means comprises a horizontal trackway immediately upstream of said framing whereby a filter may be slid into or out of position in respect to said framing, upon release of said resilient pressure means.

3. A housing of the type set forth in claim 2, having a trackway support for prefilter units disposed parallel with said first named trackway, and upstream thereof and said pressure means, and said housing having at least one closure member end for access to both of said trackways for the removal and replacement of filter and prefilter units, said member having perimetral sealing engagement with the housing end.

4. A housing as set forth in claim 1 wherein each space filter unit has a rectangular frame, one edge of which is provided with a continuous sealing element.

5. A housing as set forth in claim 1 wherein each space filter unit has a rectangular frame, one edge of which is provided with a continuous sealing element, and in which the housing has a continuous frame in its downstream side having a continuous offset adapted to continuously engage said element, and means for applying resilient pressure to the upstream edge of the filter unit rectangular frame upstream of the filter unit and continuously effective, whereby to maintain continuous pressure of the sealing element upon the continuous offset.

6. A housing as set forth in claim 5 wherein the resilient pressure applying means comprises spring members, each comprising a helical coil and resilient ends, one end of which bears against the unit rectangular frame, and in which the helical coils are fulcrummed on fulcrum members mounted in the housing, and in which rotation of the spring members about the fulcrum members is effected by applying tension to the other end of each of the spring members.

7. A housing as set forth in claim 6 wherein manual means are provided for actuating all of the other ends of the spring members for each filter unit simultaneously whereby release of or application of pressure to the upstream side of the unit frames through all of the spring members engaging a frame is effected simultaneously.

References Cited

UNITED STATES PATENTS

| | | | |
|---|---|---|---|
| 1,746,283 | 2/1930 | Reed et al. | 55—509 |
| 1,990,110 | 2/1935 | Bridges | 55—481 X |
| 2,010,809 | 8/1935 | Braine | 55—481 X |
| 2,077,951 | 4/1937 | Myers | 55—483 |
| 2,107,653 | 2/1938 | Strobell | 55—481 X |
| 2,175,195 | 10/1939 | Irvine | 55—483 X |
| 2,198,189 | 4/1940 | Vokes | 55—481 X |
| 2,252,724 | 8/1941 | Myers | 55—483 X |
| 2,804,165 | 8/1957 | Blomgren et al. | 55—481 X |
| 3,250,063 | 5/1966 | Andrews | 55—483 |
| 3,280,541 | 10/1966 | Soltis | 55—483 |

FOREIGN PATENTS

| | | |
|---|---|---|
| 1,324,386 | 3/1963 | France. |
| 1,345,574 | 11/1963 | France. |

OTHER REFERENCES

Ventilation and Air Purification Equipment for Civil Defense Protective Shelters, Flanders Filters Incorporated, Riverhead, N.Y., received in Patent Office Sept. 24, 1965, pp. 19, 21, 23 and 25.

HARRY B. THORNTON, *Primary Examiner.*

DENNIS E. TALBERT, JR., *Assistant Examiner.*

U.S. Cl. X.R.

55—483, 484, 502, 509, 521